US008257806B2

(12) United States Patent
Kimura et al.

(10) Patent No.: US 8,257,806 B2

(45) Date of Patent: Sep. 4, 2012

(54) SURROUNDING LABEL AND ARTICLE BEARING THE LABEL

(75) Inventors: Kazuyuki Kimura, Ibaraki (JP); Hiromitsu Tamauchi, Chiba (JP)

(73) Assignee: Yupo Corporation, Tokyo (JP)

(*) Notice: Subject to any disclaimer, the term of this patent is extended or adjusted under 35 U.S.C. 154(b) by 739 days.

(21) Appl. No.: 12/159,161

(22) PCT Filed: Dec. 27, 2006

(86) PCT No.: PCT/JP2006/326050

§ 371 (c)(1), (2), (4) Date: Oct. 15, 2008

(87) PCT Pub. No.: WO2007/074865

PCT Pub. Date: Jul. 5, 2007

(65) Prior Publication Data

US 2009/0169780 A1 Jul. 2, 2009

(30) Foreign Application Priority Data

Dec. 27, 2005 (JP) ................................ 2005-375969

(51) Int. Cl.

| | |
|---|---|
| ***B32B 1/00*** | (2006.01) |
| ***B32B 1/02*** | (2006.01) |
| ***B32B 1/04*** | (2006.01) |
| ***B32B 1/08*** | (2006.01) |
| ***B32B 27/08*** | (2006.01) |
| ***B32B 27/14*** | (2006.01) |
| ***B32B 27/20*** | (2006.01) |
| ***B32B 27/32*** | (2006.01) |
| ***B65D 1/00*** | (2006.01) |
| ***B65D 1/02*** | (2006.01) |
| ***G09F 3/00*** | (2006.01) |

(52) U.S. Cl. ..................... 428/34.1; 428/34.4; 428/34.6; 428/34.7; 428/35.2; 428/35.7; 428/36.4; 428/36.9; 428/36.91; 428/36.92; 40/310; 40/312

(58) Field of Classification Search ........ 428/34.1–35.9, 428/36.4–36.6, 36.9–36.92; 40/310–313

See application file for complete search history.

(56) References Cited

U.S. PATENT DOCUMENTS 5,589,034 A * 12/1996 Hultman et al. .............. 162/111
6,238,509 B1 5/2001 Herlfterkamp et al.

(Continued)

FOREIGN PATENT DOCUMENTS

DE 195 21 564 A1 1/1997

(Continued)

OTHER PUBLICATIONS

European Search Report issued with respect to patent family member EP 06843432.3, dated Jul. 7, 2010.

(Continued)

*Primary Examiner* — Walter B Aughenbaugh

(74) *Attorney, Agent, or Firm* — Greenblum & Bernstein, P.L.C.

(57) ABSTRACT

A surrounding label wherein the back side of an ending part can be superposed on and bonded with a water-based adhesive to the front side of a beginning part, the back side of the surrounding label has a water absorption of from 1 to 30 ml/$m^2$, the surrounding label has an Elmendorf tear strength, as measured in either of the winding direction of the label or the direction perpendicular to that direction, of from 8 to 50 gF, and the label contains a thermoplastic resin.

24 Claims, 2 Drawing Sheets

U.S. PATENT DOCUMENTS

| | | | | |
|---|---|---|---|---|
| 7,258,368 | B2 * | 8/2007 | Franko, Sr. | 283/94 |
| 2005/0186371 | A1 | 8/2005 | Kimura et al. | |
| 2010/0126991 | A1 | 5/2010 | Kimura et al. | |

FOREIGN PATENT DOCUMENTS

| | | | |
|---|---|---|---|
| DE | 297 21 217 | U1 | 5/1998 |
| EP | 0 045 562 | | 2/1982 |
| EP | 0 281 134 | | 9/1988 |
| EP | 0 326 039 | A1 | 8/1989 |
| JP | 56-48941 | | 5/1981 |
| JP | 1-99935 | | 4/1989 |
| JP | 2-37837 | | 3/1990 |
| JP | 5-4297 | | 1/1993 |
| JP | 5-173487 | | 7/1993 |
| JP | 5-263010 | | 10/1993 |
| JP | 7-300568 | | 11/1995 |
| JP | 2003-186400 | | 7/2003 |
| JP | 2004-29656 | | 1/2004 |
| JP | 2004-068017 | | 3/2004 |
| JP | 2004-347706 | | 9/2004 |
| JP | 2004-317657 | | 11/2004 |
| JP | 2004-347658 | | 12/2004 |

OTHER PUBLICATIONS

U.S. Appl. No. 12/704,552 to Kimura et al., filed Feb. 12, 2010.
English Language Abstract of JP 2004-347706.
English Language Abstract of JP 2004-347658.
English Language Abstract of JP 2003-186400.
English Language Abstract of JP2004-317657.
English Language Abstract of JP 55-173487.
English Language Abstract of JP 2004-29656.
English Language Abstract of JP 5-4297.
English Language Abstract of JP 5-263010.
English Language Abstract of JP 7-300568.
Japan Office action, dated Jan. 31, 2012 along with an english translation thereof.

* cited by examiner

SURROUNDING LABEL AND ARTICLE BEARING THE LABEL

TECHNICAL FIELD

The present invention relates to a surrounding label to be set by winding it around the surface of an article, and to an article such as container bearing the label. In particular, the invention relates to a surrounding label that is used on the surface of a container for water, refreshing drinks, carbonated drinks, juices, milk drinks, lactic acid beverages, beer, wine, sake (rice wine), various spirituous liquors, nutritional drinks, seasonings, medicines, cosmetics, chemicals, etc., and the main object of the label is for displaying various information such as trade name, etc.

BACKGROUND ART

To containers or products formed of plastics such as PET, or glass or metal, stuck are various types of labels formed of plastic films or paper.

For attaching a label of a plastic film to a container, there are known a method of fitting a cylindrical thermoshrinkable film label and thermally shrinking it (shrink method); and a method of fitting a cylindrical stretchable film label while stretching it (stretch method) (Patent References 1 to 3). For attaching a label of paper, there are known a method of applying a paste to the back side of a label just before stuck to a container, and then drying the paste for sticking the label (glue paste method); a method of previously applying an adhesive paste (pressure-sensitive adhesive) to the back side of a label, and sticking it under pressure (tack paste method); and a method of previously applying a delayed paste capable of expressing its adhesiveness when heated, to the back side of a label, and heating the label with hot air just before stuck to thereby make the paste sticky, and thereafter sticking it under pressure (heat-seal paste method) (Patent References 4 to 7). However, these methods have various problems as mentioned below.

The shrink method and the stretch method require a step of forming a cylindrical label, and therefore the working steps increase and the fitting apparatus is large-scaled, and accordingly, these methods are problematic in point of the costs. In addition, they may be applicable to only labels of film material, and therefore, their application to containers for which labels of paper materials are liked, such as those for soy sauce, sake, Japanese sweets and the like, is limited in point of their design variation.

The glue paste method requires control of the coating amount of paste (water-based adhesive), paste exchange, and cleaning of used paste, therefore requiring operators' skill. In addition, the water-base adhesive tends to dry slowly when applied to others than paper labels, but on the contrary, it is hard after dried; and therefore, it is defective in that, when it is applied to paper labels, the substrate may be readily broken and, after peeled, the substrate may often remain on the container surface along with paste remaining thereon. However, different from the tack paste method, this does not require a release sheet, and therefore, it is a resource-saving one like the heat-seal paste method. Further, the method comprises only paste application and sticking, and therefore, its equipment may be simple; and its other advantages are that the label-sticking speed is high and the production costs may be reduced in point of the plant and equipment investment and the working efficiency.

In the tack paste method, a tack paste is previously applied, and therefore, the method requires a processed paper that is specifically so processed as not to adhere to others just before the label sticking (this is referred to as release paper). The labeled container itself may be used just after the label sticking thereto, but the release paper is discarded as trash, therefore resulting in the increase in trash, and this is problematic in point of the waste of resources. Further, the release paper is expensive, therefore resulting in the increase in the costs. In addition, since the speed at which the label is stuck to containers is slow, and the method is unfavorable for labels for containers that are mass-produced in large quantities.

In the heat-seal paste method, a delayed paste that is not adhesive before heated but becomes adhesive after heated is previously applied to the back side of a label, and in this, therefore, the label can be readily stuck to a container only by heating it to make the paste adhesive and by applying pressure to it. Differing from the tack paste method, this method does not require release paper, and therefore this may be free from the problem of waste of resources. However, this has a problem in that, when the label is heated too high when stuck to plastic containers, they may deform; and therefore, the label must be heated and stuck at a relatively low temperature. The delayed paste generally has a composition prepared by mixing a thermoplastic resin having a glass transition temperature of from 0 to 40° C. or so and a solid plasticizer and optionally a tackifier; but when the delayed paste-coated label roll is stored in a warehouse or transported in high-temperature environments, especially in the summer, or when it is used in a thermal printing system, then the label may become sticky before use to cause blocking, and this may be another problem of making trouble.

Patent Reference 1: JP-A 56-48941
Patent Reference 2: JP-UM-A 2-37837
Patent Reference 3: JP-A 1-99935
Patent Reference 4: JP-A 55-76378
Patent Reference 5: JP-A 5-173487
Patent Reference 6: JP-A 2004-29656
Patent Reference 7: JP-A 5-4297

DISCLOSURE OF THE INVENTION

Problems that the Invention is to Solve

Heretofore, some are suitably selected depending on the use and others from various labels and labeling methods all with good points and bad points as mentioned in the above. On the other hand, recently, it has become desired to collect and reuse containers such as PET bottles and glass bottles, from the viewpoint of environmental problems and recycling of resources. In particular, with the enactment of the Law for the Promotion of Utilization of Recycled Resources for containers, the movement toward smooth recycling of containers has become more active year by year. According to the Law for the Promotion of Utilization of Recycled Resources "Guideline for Voluntary Planning of the Class II Designated PET bottles" by the PET Bottle Recycle Promotion Association, it is required that, when dipped in a washing liquid having an alkali concentration of 1.5% at 85 to 90° C. for 15 minutes, the label may peel without leaving the adhesive on the bottle. Further, it is desired that, when dipped in hot water at 85° C. for 15 minutes, the label may peel without leaving the adhesive on the bottle. Accordingly, it is said necessary to satisfy the above-mentioned requirements in separating labels from containers in recycling factories, and when bottles are collected and discarded in general families, it is said necessary that the labels may be readily peeled not requiring any special treatment and that the adhesive and the label residue do not remain on bottles.

To that effect, these days, garbage reduction and recycling by separated collection has become much more desired, and the necessity for labels easily peelable from containers is much more increasing. However, in a tack paste method, a heat-seal paste method and a glue paste method, the peeling strength of paper labels from containers increase with time and therefore, the peeling strength may be higher than the strength at the label-adhering surface, and the label substrate may be broken when the label is peeled by hand, and the label could not be readily peeled. In addition, in many cases, the adhesion strength of various pastes to the label-adhering surface may be higher than the adhesion strength of various pastes to containers, and even when labels could be peeled, the paste may remain on containers, and the trouble occurs frequently. To overcome the trouble, a recycle system has been developed in which bottles after industrial use are collected and dipped in an aqueous sodium hydroxide solution to dissolve and peel labels; however, for introducing the system, plant and equipment investment is needed for a large-scaled delabeling apparatus. In addition, in case where the system becomes popular, then it may take the opportunity that each one may think about environmental problems and notice them. On the other hand, labels of shrink film or stretch film are so planned that consumers may peel and separate them; however, in many cases, even perforated films must be peeled by force, and not only children but also even adults could not often peel them. When one tries forcedly peeling the labels, the film may encroach into nails to injure fingers.

In consideration of the prior-art problems as above, an object of the present invention is to provide an easily-peelable label that enjoys the advantage of the already-existing glue paste method. Precisely, the object of the invention is to provide an easily-peelable surrounding label suitable to recycling, which is characterized in that it has an adhesion strength to such a degree that it does not peel during distribution but, after use, it can be readily peeled by hand and, after peeled, the adhesive hardly remains; and to provide an article bearing the label.

Means for Solving the Problems

The present inventors have assiduously studied and, as a result, have found that, when the tear strength and the water absorption on the back side of a thermoplastic resin-containing surrounding label are made to fall within a predetermined range, then the prior-art problems may be solved, and have provided the following present invention.

Embodiment 1

A surrounding label having a beginning part and an ending part, which is so designed that the back side of the ending part can be superposed on and bonded with a water-based adhesive to the front side of the beginning part, and is characterized in that the back side of the surrounding label has a water absorption of from 1 to 30 ml/m$^2$, the Elmendorf tear strength of the surrounding label, as measured in either of the winding direction of the label or the direction perpendicular to that direction, is from 8 to 50 gF, and the label contains a thermoplastic resin.

Embodiment 2

The surrounding label of embodiment 1, wherein the surface strength of the back side of the surrounding label is from 0.9 to 2.0 kg-cm.

Embodiment 3

The surrounding label of embodiment 1 or 2, wherein the back side of the ending part is coated with a water-based adhesive.

Embodiment 4

The surrounding label of embodiment 3, wherein the back side of the ending part is coated with a water-based adhesive in a stripe form running in a direction nearly perpendicular to the winding direction.

Embodiment 5

The surrounding label of any one of embodiments 1 to 4, which is so designed that the back side of the beginning part of the label may bond with a water-based adhesive to an article to be labeled with the surrounding label.

Embodiment 6

The surrounding label of embodiment 5, wherein the back side of the beginning part is coated with a water-based adhesive.

Embodiment 7

The surrounding label of embodiment 6, wherein the back side of the beginning part is coated with a water-based adhesive, as any one or more patterns selected from a group consisting of dots, lattices, stripes and checks.

Embodiment 8

The surrounding label of any one of embodiments 1 to 7, which comprises a surface layer (C), a substrate layer (A) and a layer (B) to be in contact with a water-based adhesive, in that order from the front side toward the back side.

Embodiment 9

The surrounding label of embodiment 8, wherein the layer (B) to be in contact with a water-based adhesive contains an inorganic fine powder (D) in an amount of at most 90% by weight.

Embodiment 10

The surrounding label of embodiment 9, wherein the inorganic fine powder (D) is surface-treated with a surface-treating agent (E).

Embodiment 11

The surrounding label of any one of embodiments 8 to 10, wherein the substrate layer (A) and the surface layer (C) contain from 20 to 100% by weight of a thermoplastic resin, from 0 to 80% by weight of an inorganic fine powder (D) and/or from 0 to 50% by weight of an organic filler (D').

Embodiment 12

The surrounding label of any one of embodiments 8 to 11, wherein the layer (B) to be in contact with a water-based adhesive is formed of an at least monoaxially-stretched, thermoplastic resin stretched film.

Embodiment 13

The surrounding label of any one of embodiments 8 to 12, wherein the surface strength of the layer (B) to be in contact with a water-based adhesive on the side thereof to be coated with a water-based adhesive is from 0.9 to 2.0 kg-cm.

Embodiment 14

The surrounding label of any one of embodiments 1 to 13, wherein the label is stretched in a direction nearly perpendicular to the winding direction and the Elmendorf tear strength in the stretching direction is from 8 to 50 gF.

Embodiment 15

The surrounding label of any one of embodiments 8 to 14, wherein at least one side of the layer (B) to be in contact with a water-based adhesive or the surface layer (C) is printed.

Embodiment 16

The surrounding label of any one of embodiments 1 to 15, wherein a pick-up part having a width of at least 0.5 cm is formed on the side in the winding direction of the label.

Embodiment 17

The surrounding label of embodiment 16, wherein perforations are formed to cross the label from the pick-up part in a direction nearly perpendicular to the winding direction of the label.

Embodiment 18

The surrounding label of any one of embodiments 1 to 17, wherein the label is provided with a lottery, a coupon or an application ticket.

Embodiment 19

The surrounding label of embodiment 18, wherein a part of the label peeled from the pick-up part of the label forms the lottery, coupon or application ticket.

Embodiment 20

A labeled article fabricated by winding the surrounding label of any one of embodiments 3 to 19 around an article, superposing the back side of the ending part and the front side of the beginning part of the label on each other and bonding them with a water-based adhesive, thereby fitting the label to the article.

Embodiment 21

A labeled article fabricated by bonding the beginning part of the surrounding label of any one of embodiments 6 to 19 to an article, then winding the label around the article starting from the beginning part thereof, superposing the back side of the ending part and the front side of the beginning part of the label on each other and bonding them with a water-based adhesive, thereby fitting the label to the article.

Embodiment 22

The labeled article of embodiment 21, wherein the adhesive residue after peeling the label from the article is from 0 to 20% of the area of the bonding part.

Embodiment 23

The labeled article of embodiment 21 or 22, wherein after 24 hours or more from bonding the label to the article, the peeling strength between the label and the article is from 0.5 to 5 N/20 mm.

Embodiment 24

The labeled article of any one of embodiments 20 to 23, wherein the article is a container.

Effect of the Invention

The surrounding label of the invention enjoys the advantage of the already-existing glue paste method, and has an adhesion strength to such a degree that it does not peel during distribution but, after use, it can be readily peeled by hand, or that is, it is easily peelable. In addition, after peeled, the adhesive hardly remains, and therefore the label makes it easy to recycle articles such as containers, or that is, it may well solve the recent environmental problems. Further, the surrounding label of the invention has excellent waterproofness resistant to dew condensation that may occur during putting into and taking out from refrigerators.

Figure 1:
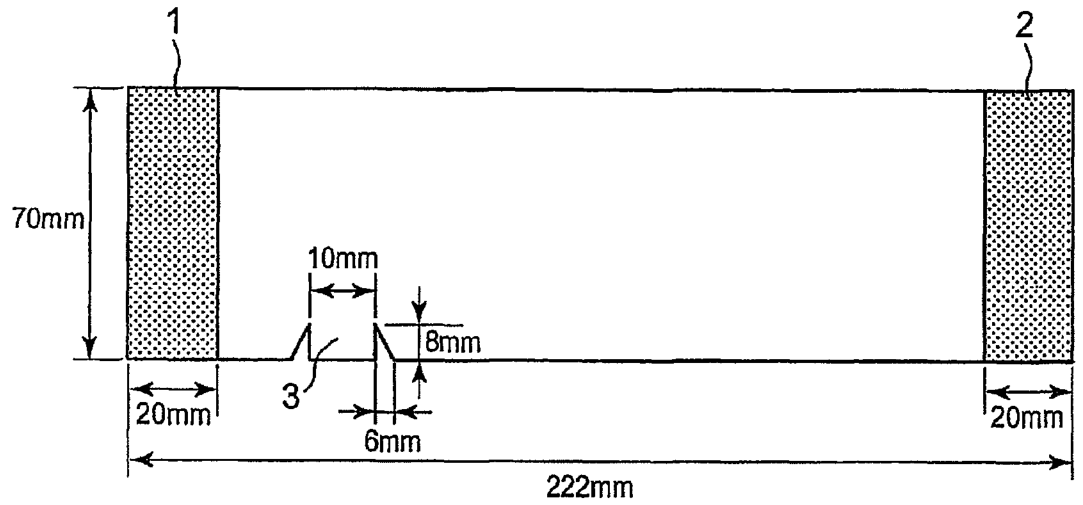
[FIG. 1] It is a front view showing one embodiment of the surrounding label of the invention.

In the drawings, 1 is a beginning part, 2 is an ending part, and 3 is a pick-up part.

BEST MODE FOR CARRYING OUT THE INVENTION

The surrounding label of the invention is described in detail hereinunder. The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

Constitution and Characteristics of Surrounding Label:

The surrounding label of the invention is a surrounding label having a beginning part and an ending part. The surrounding label as referred to herein is a label that is so designed as to be fittable to articles such as containers, as follows: The label is wound around the surface of an article, starting from the beginning part of the label, and the back side of the ending part of the label is superposed on the front side of the beginning part thereof, and the two are bonded to each other. The beginning part and the ending part are needed to have an area to such a degree that they may be superposed on and bonded to each other. The area varies depending on the shape of the surrounding label of the invention, the type and the amount of the water-based adhesive to be used and the shape and the surface condition of the article to which the label is fitted; and in general, the area of the beginning part and the ending part may be from 3 to 30% each of the overall area of the surrounding label, preferably from 5 to 20%, more preferably from 7 to 15%.

FIG. 1 is a view showing one embodiment of the surrounding label of the invention. The surrounding label of the invention is preferably rectangular, as shown in the drawing, and its four corners may be round. Apart from it, the label may not always be rectangular, but may be, for example, trapezoidal, parallelogrammic or fan-shaped. In case where the surrounding label of the invention is rectangular, the ratio of its long side to its narrow side is not specifically defined. FIG. 1 explicitly shows a preferred dimension of the surrounding label of the invention. As illustrated, the label may have a size of 222 mm×70 mm, and the width of the beginning part and the ending part thereof may be, for example, from 5 to 100 mm, more preferably from 10 to 30 mm, even more preferably from 15 to 25 mm.

Figure 2:
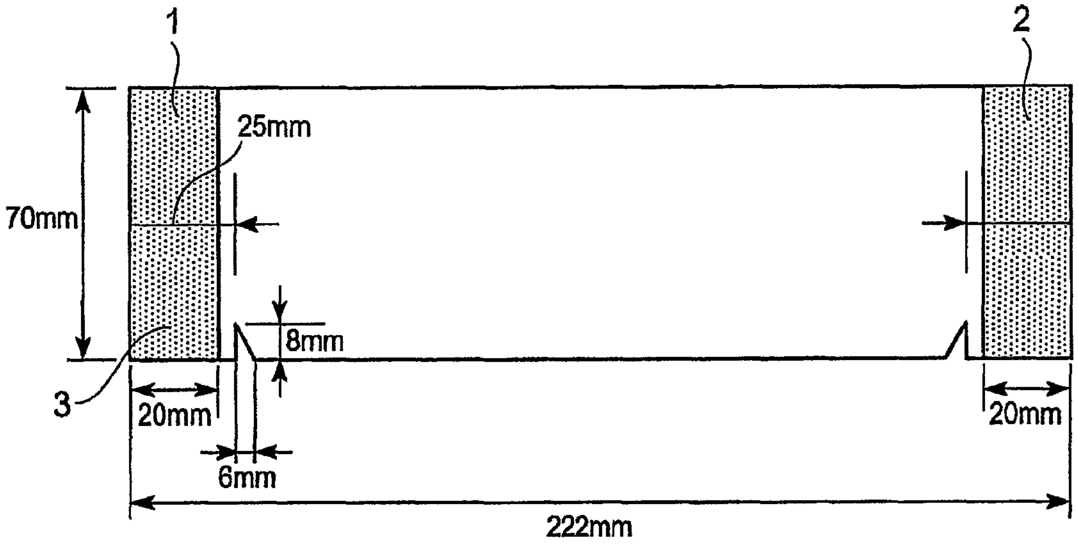
[FIG. 2] It is a front view showing another embodiment of the surrounding label of the invention.

The surrounding label of the invention preferably has a pick-up part formed so as to be picked up with fingers for facilitating the peeling of the label. In peeling the label, the pick-up part is picked up with fingers, and the label may be torn whereby a majority of the label may be separated from articles such as containers. The pick-up part may be formed at the side in the winding direction of the label. The pick-up part may be formed at the side of the label, excepting the beginning part and the ending part thereof, as in FIG. 1; or as in FIG. 2, it may be formed so as to include the beginning part and the ending part. From the viewpoint of easy peelability, it is desirable that the pick-up part is formed at the side of the label excepting the beginning part and the ending part thereof as shown in FIG. 1.

For example, as in FIG. 1, two notches may be formed on the long side, as spaced by a distance of 10 mm, whereby a pick-up part having a width of 10 mm may be formed. Not specifically defined, the shape of the pick-up part may be any one capable of being picked up with fingers; and for example, it may have a shape protruding from the side like a tag. Preferably, the width of the pick-up part is at least 0.5 cm, more preferably at least 0.7 cm. Its uppermost limit may be generally up to 5 cm, preferably up to 3 cm. When the width of the pick-up part is at least 0.5 cm, then the part may be readily picked up with fingers; and when it is at most 5 cm, then the label may be readily torn.

In order to be readily torn and peeled, the surrounding label of the invention is preferably so designed that the Elmendorf tear strength thereof, as measured in either of the winding direction of the label or the direction perpendicular to that direction, is from 8 to 50 gF. The Elmendorf tear strength is more preferably from 10 to 45 gF. When the Elmendorf tear strength is less than 8 gF, then it is unfavorable since the label itself may be broken owing to rubbing of labels or expansion of containers, etc. during transportation. When the Elmendorf tear strength is more than 50 gF, then it is unfavorable since the resistance in tearing may be large and the label may be cut on the way during tearing. In case where the strength is at most 50 gF, then the label may be torn linearly with no resistance during tearing. For making the label has an Elmendorf tear strength of from 8 to 50 gF, it is especially desirable to use a film stretched in a direction nearly perpendicular to the winding direction of the label. The Elmendorf tear strength as referred to in the invention is measured, based on JIS-P-8116.

Figure 3:
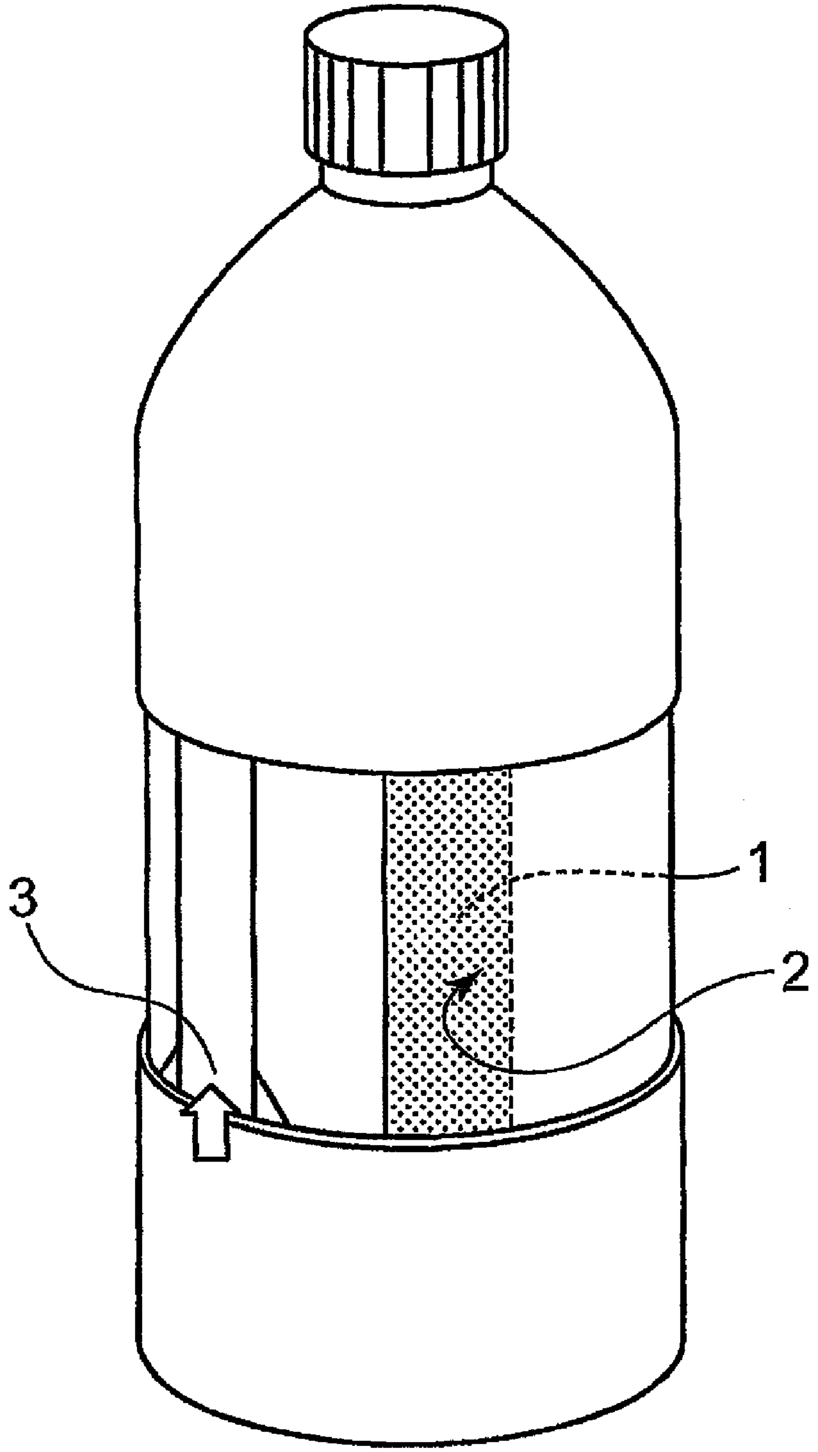
[FIG. 3] It is a perspective view showing one embodiment of the labeled article of the invention.

Preferably, from the pick-up part formed in the surrounding label of the invention, perforations extend to cross the label. For example, perforations may be formed from the edges of the two notches shown in FIG. 1, so as to cross the label at the shortest distance. In one preferred embodiment, perforations are formed in a direction nearly perpendicular to the winding direction of the label. The nearly perpendicular direction, as referred to in the invention, means a direction falling within a range of ±20 degrees from the perpendicular direction, preferably within a range of ±10 degrees, more preferably within a range of ±5 degrees, even more preferably within a range of ±3 degrees. Forming the perforations to cross the label makes it possible to easily tear the label and peel it from articles, by picking up the pick-up part with fingers and pulling it up in the direction in which the perforations extend like the arrow shown in FIG. 3.

The surrounding label of the invention is wound around an article such as a container, starting from the beginning part thereof, and the back side of the ending part is superposed on and bonded to the front side of the beginning part thereof with a water-based adhesive, whereby the label may be fitted to the article. In this case, the back side of the ending part may be previously coated with a water-based adhesive; or a water-based adhesive may be inserted between the back side of the ending part and the front side of the beginning part, just before bonding. The former is preferred. The surrounding label of the invention is so designed that its back side has a water absorption of from 1 to 30 ml/m$^2$. Preferably, the water absorption is from 3 to 28 ml/m$^2$, more preferably from 3 to 20 ml/m$^2$. In case where the water absorption is less than 1 ml/m$^2$, then water in the paste could not completely penetrate into the label and the desired adhesion strength could not be attained. When the water absorption is at least 1 ml/m$^2$, then the label may fully has the initial adhesion power in its labeling, not taking too much time in drying the paste, and therefore the label may be prevented from slipping off or dropping down, and the label may be fitted at high speed. On the contrary, in case where the water absorption is more than 30 ml/m$^2$, then the label may absorb too much water from the paste, and the paste itself may be dried before labeling and the label could not have the desired adhesion force. When the water absorption is at most 30 ml/m$^2$, then the paste may not dry just after applied to the back side of the label, and the label may have the desired adhesion force. In order that the water absorption may fall from 1 to 30 ml/m$^2$, a layer (B) to be in contact with a water-based adhesive, which is described below, may be provided on the back side of the label, and the thickness of the layer (B) or the amount of the inorganic fine powder (D) to be in the layer (B) may be controlled.

Preferably, the back side of the surrounding label of the invention has a surface strength of at least 0.9 kg-cm. More preferably, it is at least 1.0 kg-cm. In case where the surface strength is less than 0.9 kg-cm, then when the label is peeled from an article such as a container, the surface strength of the label may be relatively lower than the adhesion strength between the adhesive and the surface of the article and therefore the label surface may be broken and the label substrate residue and the adhesive residue may remain on the surface of the article. Similarly, the surface strength of the back side is preferably at most 2.0 kg-cm. When it is at most 2.0 kg-cm, then the adhering surface may express a sufficient absorption capability, and therefore the label may readily exhibit a good adhesion capability in labeling with it. In order that the surface strength may fall from 0.9 to 2.0 kg-cm, a layer (B) to be in contact with a water-based adhesive, which is described below, may be provided on the back side of the label, and the draw ratio in stretching of the layer (B) or the amount of the inorganic fine powder (D) to be in the layer (B) may be controlled.

The surrounding label of the invention may be bonded to an article such as a container, by applying a water-based adhesive to the back side of the beginning part thereof. Preferably, in at least 24 hours after bonding to an article, the peeling force from the article is at least 0.5 N/20 mm, more preferably at least 1.0 N/20 mm. When the peeling force is at least 0.5 N/20 mm, then the label may hardly peel off during transportation. Preferably, the peeling force is at most 8 N/20 mm, more preferably at most 5 N/20 mm. When it is at most 8 N/20 mm, then a trouble may be evaded, such that the adhesion force is too large and the paste may remain on the surface of an article in peeling the label. When it is at most 5 N/20 mm, then the label may be readily peeled by hand, and the paste residue may be further reduced.

The peeling force and the adhesion force of the surrounding label of the invention may be controlled by selecting the type of the water-based adhesive. The adhesive for label for use in the invention is a "water-based adhesive (glue paste)" that comprises a water-based solvent, and a natural polymer or a solid plasticizer and a polymer; and in order that the label may be readily peeled by hand, the adhesive is preferably such that its adhesion power does not too much change with time. In case where a paste of which the adhesion force greatly increases with time is used and the final adhesion strength is set lower than the substrate strength, then the initial adhesion force in sticking the label may be extremely low and the label may sag after stuck, or the label may be peeled by minor shock.

The peeling force and the adhesion force of the surrounding label of the invention may be controlled by changing the adhesive application pattern. For example, the water-based adhesive to be applied to the back side of the beginning part preferably has at least one pattern selected from dots, lattices, stripes and checks. Specifically, the adhesive is applied as a pattern comprising an adhesive part and a non-adhesive part, and the areal ratio of adhesive part/non-adhesive part may be changes so as to control the adhesion force. The water-based adhesive to be applied to the back side of the ending part preferably has a stripe form running in a direction nearly perpendicular to the winding direction.

Layer Constitution and Material of Surrounding Label:

The surrounding label of the invention contains a thermoplastic resin. Preferably, the label is formed of a thermoplastic resin. Preferably, the surrounding label of the invention has a layer (B) to be in contact with a water-based adhesive, and for securing the strength and duplicate printability, it may further contain a substrate layer (A) and a surface layer (C). A more preferred layer constitution comprises a substrate layer (A) as the center layer, and has a surface layer (C) formed on its surface, and a layer (B) to be in contact with a water-based adhesive, formed on the back side thereof.

The substrate layer (A) and the surface layer (C) each contain a thermoplastic resin in an amount of preferably from 20 to 100% by weight, more preferably from 30 to 80% by weight, even more preferably from 40 to 70% by weight, an inorganic fine powder (D) in an amount of preferably from 0 to 80% by weight, more preferably from 20 to 70% by weight, even more preferably from 30 to 60% by weight, and/or an organic filer (D') in an amount of preferably from 0 to 50% by weight, more preferably from 0 to 40% by weight, even more preferably from 0 to 30% by weight. When the content of the inorganic fine powder (D) is at most 80% by weight and that of the organic filer (D') is at most 50% by weight, then a film having a uniform thickness may be easy to obtain.

The content of the thermoplastic resin to be in the layer (B) to be in contact with a water-based adhesive is preferably from 10 to 100% by weight, more preferably from 15 to 99% by weight, even more preferably from 20 to 80% by weight, still more preferably from 40 to 70% by weight. The content of the inorganic fine powder (D) in the layer (B) to be in contact with a water-based adhesive is preferably from 0 to 90% by weight, more preferably from 1 to 85% by weight, even more preferably from 20 to 80% by weight, still more preferably from 30 to 60% by weight. Depending on the content of the inorganic fine powder in the layer (B), the water absorption of the label may be controlled; and the inorganic fine powder content of at most 90% by weight is advantageous in that the film may be more easily stretched.

The layers may optionally contain heat stabilizer, UV stabilizer, antioxidant, antiblocking agent, nucleating agent, lubricant, colorant, etc. Preferably, the additives are in a ratio of at most 3% by weight.

[Thermoplastic Resin]

The thermoplastic resin film for use for the surrounding label of the invention contains a thermoplastic resin. The usable thermoplastic resin includes crystalline polyolefin-based resins such as crystalline ethylene-based resin (e.g., high-density polyethylene, medium-density polyethylene, low-density polyethylene), crystalline propylene-based resin, polymethyl-1-pentene; polyamide-based resins such as nylon-6, nylon-6,6, nylon-6,10, nylon-6,12; thermoplastic polyester-based resins such as polyethylene terephthalate and its copolymer, polyethylene naphthalate, aliphatic polyester; thermoplastic resins such as polycarbonate, atactic polystyrene, syndiotactic polystyrene, polyphenylene sulfide. Two or more of these may be used, as combined.

Of those, preferred are crystalline polyolefin-based resins from the viewpoint of the chemical resistance and the production cost thereof; and more preferred are crystalline propylene-based resins. Crystalline polyolefin-based resins exhibit crystallinity. In general, the degree of crystallinity of the resins, as measured through X-ray diffractiometry, is preferably at least 20%, more preferably from 35 to 75%. Those with no crystallinity could not fully form pores (openings) in the surface of thermoplastic resin films by stretching. The degree of crystallinity may be measured according to a method of X-ray diffractiometry or IR spectrometry.

The crystalline propylene-based resins for use herein are preferably isotactic polymers or syndiotactic polymers prepared by homopolymerization of propylene. Also usable are propylene-based copolymers with various stereospecificity, as prepared through copolymerization with of propylene with x-olefin such as ethylene, 1-butene, 1-hexene, 1-heptene, 4-methyl-1-pentene. The copolymers may be binary or ternary or more polynary, and may be random copolymers or block copolymers.

[Inorganic Fine Powder (D) and Organic Filler (D')]

The inorganic fine powder (D) usable in the thermoplastic resin film to constitute the surrounding label of the invention includes inorganic fine powders such as heavy calcium carbonate, light calcium carbonate, calcined clay, talc, titanium oxide, barium sulfate, zinc oxide, magnesium oxide, diatomaceous earth, silicon oxide; composite inorganic fine powders having aluminium oxide or hydroxide around the nuclei of inorganic fine powders; hollow glass beads, etc. Above all, preferred are heavy calcium carbonate, calcined clay and diatomaceous earth, as they are inexpensive and may form many pores in stretching.

The organic filler (D') usable in the thermoplastic resin film to constitute the surrounding label of the invention is preferably selected from resins having a higher melting point or glass transition point than the above-mentioned thermoplastic resins and miscible with them for the purpose of pore formation. Its concrete examples are polyethylene terephthalate, polybutylene terephthalate, polyamide, polycarbonate, polyethylene naphthalate, polystyrene, polymers and copolymers of acrylate or methacrylate, melamine resin, polyethylene sulfide, polyimide, polyethyl ether ketone, polyphenylene sulfide, homopolymers of cyclic olefin and copolymers of cyclic olefin and ethylene (COC). In case where a crystalline polyolefin-based resin is used as the above-mentioned thermoplastic resin, then the organic filler (D') is especially preferably selected from polyethylene terephthalate, polybutylene terephthalate, polyamide, polycarbonate, polyethylene naphthalate, polystyrene, homopolymers of cyclic olefin and copolymers of cyclic olefin and ethylene (COC).

The content of the organic filler (D') in the substrate layer (A) and the surface layer (C) of the surrounding label of the invention is preferably from 0 to 50% by weight, more preferably from 0 to 40% by weight.

The mean particle size of the inorganic fine powder (D) and the mean dispersed particle size of the organic filler (D') for use in the invention are preferably within a range of from 0.1 to 20 μm, more preferably from 0.5 to 15 μm. In consideration of its easy mixing with thermoplastic resin, preferred are those not smaller than 0.1 μm. Those having a particle size of at least 0.1 μm facilitate pore formation by stretching, therefore more readily giving a stretched film having a desired surface profile. Those having a particle size of at most 20 μm secure good stretching and may effectively prevent cutting or breaking in holes by stretching in shaping.

The mean particle size of the inorganic fine powder (D) for use in the invention may be determined, by measuring the particle size of 50% accumulation, using, as one example, a particle sizer such as a laser diffractiometric particle analyzer (Nikkiso's trade name, Microtrack) (50% accumulation particle size).

The mean dispersed particle size of the organic filler (D'), as dispersed in a thermoplastic resin by melt kneading and dispersion, may be the mean value of the particle size thereof as determined by analyzing at least 10 particles in the cross section of the surrounding label through electromicroscopic observation. One of the inorganic fine powder (D) or the organic filler (D') may be selected from the above and used herein; or two or more may be selected and used as combined. In case where two or more are combined and used, then the combination may be the inorganic fine powder (D) and the organic filler (D').

[Surface-Treating Agent (E)]

The surface-treating agent (E) usable for the inorganic fine powder for use in the thermoplastic resin film that constitutes the surrounding label of the invention is preferably a copolymer (water-soluble cationic copolymer) of one (E1) selected from diallylamine salts or alkyldiallylamine salts and a nonionic hydrophilic vinyl monomer (E2). "Salt" indicates those in which the anion to form the salt is selected from chloride ion, bromide ion, sulfate ion, nitrate ion, methylsulfate ion, ethylsulfate ion, methanesulfonate ion.

Specific examples of (E1) include diallylamine salts, alkyldiallylamine salts and dialkyldiallylamine salts having from 1 to 4 carbon atoms, or that is, methyldiallylamine salts, ethyldiallylamine salts, dimethyldiallylamine salts; methacryloyloxyethyltrimethylammonium, acryloyloxyethyltrimethylammonium, methacryloyloxyethyldimethylethylammonium or acryloyloxyethyldimethylethylammonium chloride, bromide, methosulfate or ethosulfate; and quaternary ammonium salts obtained by alkylating N,N-dimethylaminoethyl methacrylate or N,N-dimethylaminoethyl methacrylate with epoxy compound such as epichlorohydrin, glycidol, glycidyltrimethylammonium chloride. Of those, preferred are diallylamine salts, methyldiallylamine salts and dimethyldiallylamine salts.

Specific examples of (E2) include acrylamide, methacrylamide, N-vinylformamide, N-vinylacetamide, N-vinylpyrrolidone, 2-hydroxyethyl methacrylate, 2-hydroxyethyl acrylate, 2-hydroxypropyl(meth)acrylate, 3-hydroxypropyl (meth)acrylate, methyl(meth)acrylate, ethyl (meth)acrylate, butyl(meth)acrylate. Of those, preferred are acrylamide and methacrylamide. The copolymerization ratio of (E1) to (E2) may be any desired one. As its preferred range, (E1) is from 10 to 99 mol %, more preferably from 50 to 97 mol %, even more preferably from 65 to 95 mol %, and (E2) is from 1 to 90 mol %, more preferably from 3 to 50 mol %, even more preferably from 5 to 35 mol %.

The surface-treating agent (E) to be derived from (E1) and (E2) may be obtained by reacting the above monomer mixture in an aqueous medium, using a polymerization initiator such as ammonium persulfate or 2,2-azobis(2-amidinopropane) dihydrochloride, at 40° C. to 100° C., as one example, at 50 to 80° C. for 2 hours to 24 hours. The polymer may be produced according to the method described in JP-A 5-263010, 7-300568, and may be used for attaining the object of the invention. A part of those described in JP-A 57-48340, 63-235377 are also usable. Of those, preferred are copolymers of diallylamine or diallyldimethylamine hydrochloride or sulfate and methacrylamide or acrylamide.

The molecular weight of the polymer may be generally from 0.05 to 3, preferably from 0.1 to 0.7, more preferably from 0.1 to 0.45, in terms of the limiting viscosity in an aqueous sodium chloride (1 mol/L) solution at 25° C. The weight-average molecular weight, as measured through gel permeation chromatography, may be generally from about 5000 to 950000, preferably from about 10000 to 500000, more preferably from about 10000 to 80000.

The surface-treating agent (E) of a water-soluble anionic surfactant has an anionic functional group in the molecule. Its specific examples are mentioned below, and these may be suitably selected and used herein.

The specific examples include (E3) sulfonic acid salts having a hydrocarbon group with from 4 to 40 carbon atoms; (E4) phosphoric ester salts having a hydrocarbon group with from 4 to 40 carbon atoms, salts of phosphoric mono or di-ester of higher alcohol having from 4 to 40 carbon atoms; (E5) alkylbetaines or alkylsulfobetaines having a hydrocarbon group with from 4 to 40 carbon atoms.

"Salt" in (E3) to (E4) indicates lithium salts, sodium salts, potassium salts, calcium salts, magnesium salts, primary to quaternary ammonium salts, primary to quaternary phosphonium salts. Preferred salts are lithium salts, sodium salts, potassium salts, quaternary ammonium salts; and more preferred are sodium salts or potassium salts.

The sulfonic acid salts having a hydrocarbon group with from 4 to 40 carbon atoms (E3) include sulfonic acid salts and sulfoalkane-carboxylic acid salts having a linear, branched or cyclic structure and having from 4 to 40 carbon atoms, preferably from 8 to 20 carbon atoms. Concretely, they include alkylbenzenesulfonic acid salts and naphthalenesulfonic acid salts having from 4 to 40 carbon atoms, preferably from 8 to 20 carbon atoms; alkylnaphthalenesulfonic acid salts having a linear, branched or cyclic structure and having from 4 to 30 carbon atoms, preferably from 8 to 20 carbon atoms; diphenyl ether or biphenyl sulfonic acid salts having a linear or branched alkyl group and having from 1 to 30 carbon atoms, preferably from 8 to 20 carbon atoms; alkylsulfate ester salts having from 1 to 30 carbon atoms, preferably from 8 to 20 carbon atoms; sulfonic acid salts of alkyl alcohol/alkylene oxide adducts having from 8 to 30 carbon atoms, preferably from 10 to 20 carbon atoms.

Their specific examples are various isomers of alkanesulfonic acid or aromatic sulfonic acid salts, such as octanesulfonic acid salts, dodecanesulfonic acid salts, hexadecanesulfonic acid salts, octadecanesulfonic acid salts, 1- or 2-dodecylbenzenesulfonic acid salts, 1- or 2-hexadecylbenzenesulfonic acid salts, 1- or 2-octadecylbenzenesulfonic acid salts, dodecylnaphthalenesulfonic acid salts; salts of β-naphthalenesulfonic acid/formalin condensates; various isomers of octylbiphenylsulfonic acid salts; dodecyldiphenylether sulfonic acid salts, dodecyllignin-sulfonic acid salts; alkylsulfate ester salts such as dodecylsulfate salts, hexadecylsulfate salts; sulfoalkanecarboxylic acid salts such as those of sulfosuccinic acid dialkyl esters in which the alkyl group is linear, branched or cyclic and has from 1 to 30 carbon atoms, preferably from 4 to 20 carbon atoms, more concretely salts of di(2-ethylhexyl) sulfosuccinate, salts of N-methyl-N-(2-sulfoethyl)alkylamide (in which the alkyl group has from 1 to 30 carbon atoms, preferably from 12 to 18 carbon atoms), for example, amide compounds derived from N-methyltaurine and oleic acid, salts of 2-sulfoethyl carboxylates having from 1 to 30 carbon atoms, preferably from 10 to 18 carbon atoms; laurylsulfate triethanolamine, ammonium laurylsulfate; polyoxyethylene-laurylsulfate salts, polyoxyethylene cetylsulfate salts; sulfonic acid salts of alkyl alcohol/alkyleneoxide adducts having from 8 to 30 carbon atoms, preferably from 10 to 20 carbon atoms, for example, sulfate ester salts of lauryl alcohol/ethylene oxide adduct, sulfate ester salts of cetyl alcohol/ethylene oxide adduct, sulfate ester salts of stearyl alcohol/ethylene oxide adduct.

Specific examples of the phosphoric acid mono- or di-ester salts or phosphoric triesters having a linear, branched or cyclic structure and having from 4 to 40 carbon atoms (E4), preferably phosphoric acid mono- or di-ester salts or phosphoric triesters having a linear, branched or cyclic structure and having from 8 to 20 carbon atoms include disodium salts or dipotassium salts of dodecyl phosphate, disodium salts of hexadecyl phosphate, disodium salts or potassium salts of didodecyl phosphate, sodium salts or potassium salts of dihexadecyl phosphate, and phosphoric triesters of dodecyl alcohol/ethylene oxide adduct.

Specific examples of the alkylbetaines or alkylsulfobetaines having a hydrocarbon group with from 4 to 30 carbon atoms, preferably from 10 to 20 carbon atoms (E5) include lauryldimethylbetaine, stearyldimethylbetaine, dodecyldimethyl(3-sulfopropylene)ammonium inner salt, cetyldimethyl (3-sulfopropyl)ammonium inner salt, stearyldimethyl(3-sulfopropyl)ammonium inner salt, 2-octyl-N-carboxymethyl-N-hydroxyethylimidazolium betaine, 2-lauryl-N-carboxymethyl-N-hydroxyethylimidazolium betaine.

Of those, preferred are (E3); and more preferred are those selected from alkanesulfonic acid salts having from 10 to 20 carbon atoms, aromatic sulfonic acid salts having an alkyl group with from 10 to 20 carbon atoms, and sulfate ester salts of alkyl alcohol/alkylene oxide adducts having from 10 to 20 carbon atoms.

[Inorganic Fine Powder (D) Hydrophilicated with Surface-Treating Agent (E)]

In the invention, the inorganic fine powder (D) may be surface-treated with at least one surface-treating agent (E). Various known methods are applicable to the surface treatment; and with no specific limitation, the mixing apparatus and the temperature and the time for mixing may be suitably selected depending on the capabilities and the physical properties of the surface-treating agent components. The L/D (length/diameter of axis) of various mixers to be sued, the shape of the stirring blades, the shear rate, the specific energy, the residence time, the treatment time, the treating temperature and others may be suitably selected in accordance with the properties of the components to be used.

One example of surface treatment is described. Calcium carbonate may be produced by wet grinding, as follows: 100 parts by weight of coarse particles of calcium carbonate having a particle size of from 10 to 50 μm are wet-ground in the presence of a necessary amount of a surface-treating agent in an aqueous medium to make the particles have a desired particle size. Concretely, calcium carbonate is added to an aqueous medium in such a manner that the ratio by weight of calcium carbonate/aqueous medium (concretely, water) could be from 70/30 to 30/70, preferably from 60/40 to 40/60, then a cationic copolymer dispersant is added thereto in an amount of from 0.01 to 10 parts, as the solid content, per 100 parts by weight of calcium carbonate, preferably from 0.1 to 5 parts by weight, and these are wet-ground in an ordinary manner. Apart from it, an aqueous medium may be prepared by dissolving a surface-treating agent therein in an amount to fall within the above-mentioned range, and the aqueous medium may be mixed with calcium carbonate and wet-ground in an ordinary manner.

The wet grinding may be attained batchwise or continuously, and for it, preferably used is a mill of a grinding device such as sand mill, attritor or ball mill. Thus wet-ground, calcium carbonate may be obtained, having a mean particle size of from 2 to 20 μm, preferably from 2.2 to 5 μm.

Next, the wet-ground product is dried. Before drying, a classification step may be provided, in which 350 mesh-on coarse particles may be removed. The drying may be attained in a known method of hot air drying or spray drying. Preferred is medium-fluidized drying. The medium-fluidized drying is a method of drying various substances as follows: A slurry substance is supplied into a phase of medium particles (fluidized layer) that is in a fluidized state with hot air (80 to 150° C.) in a drying tower, then the thus-fed slurry substance is dispersed in the fluidized drying tower while filmwise adhering to the surfaces of the actively fluidizing medium particles, and receives the drying action by the hot air therein. The medium fluidized drying of the type may be readily carried out, for example, using a medium fluidized drying apparatus, Nara Machinery Manufacturing's "Media Slurry Drier" or the like. The medium fluidized drying is preferred since both drying and grinding of aggregated particles (removal of primary particles) may be attained simultaneously. When the wet-ground slurry obtained according to the method is dried in a mode of medium fluidized drying, calcium carbonate having an extremely small amount of coarse particle may be obtained. However, it may also be effective to attain grinding and classification in a desired manner after the medium fluidized drying. On the other hand, in case where a wet-ground product is dried by ordinary hot air drying in place of medium fluidized drying, then the it is desirable that the obtained cake is further ground and classified in a desired method.

The dry cake of a wet-ground product obtained according to the method is readily crushed, therefore capable of giving surface-treated calcium carbonate with ease. Accordingly, the method does not require an additional step of grinding the dry cake.

The calcium carbonate fine particles thus surface-treated in the manner as above may be optionally further treated with any other surface-treating agent.

The amount of the surface-treating agent (E) to be used varies depending on the use of the label of the invention; but in general, it may be from 0.01 to 10 parts by weight relative to 100 parts by weight of the inorganic fine powder, preferably from 0.04 to 5 parts by weight, more preferably from 0.07 to 2 parts by weight. Even if the amount exceeds over 10 parts by weight, the effect of the surface-treating agent may not be higher, as saturated.

[Water-Based Adhesive]

Preferred examples of the water-based adhesive for use in the invention are those containing at least one selected from a group consisting of starch, glue, casein, cellulose, sodium alginate, guar gum, latex, polymaleic acid polymer, polyvinyl alcohol, polyvinylpyrrolidone, carboxymethyl cellulose, methyl cellulose, gelatin, pullulan, acrylic resin, urethane resin, vinyl acetate resin. Of those, more preferred are those containing starch or casein. The water-base adhesive for use herein may be an aqueous solution or emulsion containing the above-mentioned substance.

The drying and coating method with a water-based adhesive may be suitably determined depending on the water absorption of the label to which it is applied. In general, the dry coating amount of the water-based adhesive may be preferably from 1 to 100 g/m$^2$, more preferably from 2 to 50 g/m$^2$, even more preferably from 10 to 30 g/m$^2$. In case where the dry coating amount of the water-based adhesive is at least 1 g/m$^2$, then the adhesive may provide a sufficient adhesion strength between the label and an article such as container. In case where the coating amount is at most 100 g/m$^2$, then the water-based adhesive may be efficiently dried and the label may be prevented from slipping down owing to the undried adhesive.

The area to be coated with the water-based adhesive according to the above-mentioned method may be generally at least 10% of the back side of the beginning part or the ending part, preferably from 30 to 90%, more preferably from 50 to 80%. In case where the area is at least 10%, then the adhesive may readily provide high adhesiveness between the label and an article such as container. When the area is 100%, then a sufficient adhesion force may be attained; and when it is at most 90%, air of an nonbonding part may be kept in some degree between the label and an article, and therefore, after stuck, the drying time for the water-based adhesive may be shortened more, and the peeling strength and the amount of the paste residue may be readily controlled.

The type and the amount of the water-based adhesive to be applied to the back side of the beginning part of the surrounding label of the invention may be the same as or different from those of the water-based adhesive to be applied to the back side of the ending part.

Fabrication of Surrounding Label:

The surrounding label of the invention may be fabricated by combining various methods known to those skilled in the art. Surrounding labels fabricated by any method fall within the scope of the invention so far as they satisfy the conditions as stated in the claims.

The substrate layer (A) and the surface layer (C) for use in the invention may be formed according to a film-forming method of mixing and extruding a thermoplastic resin, an inorganic fine powder (D) and/or an organic filler (D') in a predetermined ratio. The film formation may be followed by monoaxial or biaxial stretching at a temperature lower than the melting point of the thermoplastic resin, preferably lower by from 5 to 60° C.

The layer (B) to be in contact with a water-based adhesive for use in the invention may be formed according to a film-forming method of mixing and extruding a thermoplastic resin and a surface-treated inorganic fine powder (D) in a predetermined ratio. The film formation may be followed by monoaxial or biaxial stretching at a temperature lower than the melting point of the thermoplastic resin, preferably lower by from 5 to 60° C.

The surrounding label of the invention may be printed with patterns or letters on both sides thereof. For example, the front surface of the label may be printed with patterns or letters of various informations such as typically trade name. A part of the label peeled for removing the label may be utilized as a lottery, a coupon or an application ticket (application label). In case where the label is printed with patterns or letters on the layer (B) to be in contact with a water-based adhesive, then the printed patterns or letters could not be confirmed from the front side of label, but when the label is fitted to a transparent article, then the printed patterns or letters may be visualized through the inside of the article. The label may be fitted to an opaque article daringly so that the printed patterns or letters could be visualized only after the label is peeled. In particular, this is effective for lots. The method of printing patterns or letters is not specifically defined, for which any ordinary method is employable.

The surrounding label of the invention may be laminated on any other thermoplastic resin film, laminate paper, pulp paper, unwoven fabric, woven fabric or the like in accordance with the use thereof and not overstepping the spirit and the scope of the invention. In addition, the label may have a metal layer (metal foil, metal layer formed by vapor deposition) of aluminium, silver or the like.

The laminate film structure may be fabricated by separately forming the individual layers and then laminating them; or by laminating the constitutive layers and then stretching the resulting laminate. These methods may be suitably combined.

The thermoplastic resin film for use in the invention may be unstretched, or may be stretched monoaxially or biaxially. The surrounding label of the invention may be fabricated, for example, as a three-layered, monoaxially or biaxially oriented laminate structure, by separately laminating a surface layer (C) and a layer (B) to be in contact with a water-based adhesive on each side of a substrate layer (A) followed by monoaxially or biaxially stretching it at a temperature lower than the melting point of the resin. A substrate layer (A) may be previously monoaxially stretched, then laminated with a surface layer (C) and a layer (B) to be in contact with a water-based adhesive on each side thereof, and again monoaxially stretched in the direction different from that for the previous stretching, thereby fabricating a laminate structure oriented monoaxially/biaxially/monoaxially. The constitutive layers may be separately stretched and the laminated, but the above method comprising first laminating the layers and then stretching them all at a time is simple and inexpensive for its production cost. Preferably, the surrounding label of the invention is obtained according to these methods.

For stretching, employable are various known methods. The stretching temperature may be lower than the melting point of the resin generally by from 5 to 60° C.; and in case where two or more resins are used as combined, it is desirable that the stretching temperature is lower than the melting point of the resin of which the amount is the highest, generally by at least 5° C.

Concrete methods for stretching include roll-to-roll stretching based on the difference in the peripheral speed of rolls, and clip stretching using a tenter oven. Roll-to-roll stretching is preferred as it enables controlling the draw ratio in stretching in any desired manner and facilitates producing a thermoplastic resin film having desired toughness, opacity, smoothness and glossiness.

Not specifically defined, the draw ratio in stretching may be determined in consideration of the object of using the surrounding label of the invention and of the characteristics of the resin used. In roll-to-roll stretching, in general, the draw ratio is preferably from 2 to 11 times, more preferably from 3 to 10 times, even more preferably from 4 to 7 times. In clip stretching with a tenter oven, the film is preferably stretched at a draw ratio of from 4 to 11 times. The areal draw ratio that is a product of the draw ratio in the machine direction of a label substrate and that in the transverse direction may be generally from 2 to 80 times, preferably from 3 to 60 times, more preferably from 4 to 50 times. When the areal draw ratio is at least 2 times, then a more uniform and thicker thermoplastic resin film may be readily produced with preventing uneven stretching. When the ratio is at most 80 times, then it may effectively prevent cutting or breaking in large holes in stretching.

After stretched, the thermoplastic resin film is preferably annealed. Preferably, the annealing temperature is preferably so selected as to fall within a range of from the stretching temperature to a temperature higher than the stretching temperature by 30° C. Annealing may relax the latent stress given by stretching, whereby the thermal shrinkage in the stretching direction may lower to reduce tightening of wound films during storage or waving to be caused by thermal shrinkage. For the method of annealing, generally employed is roll heating or oven heating; and these may be combined. For the treatment, it is desirable that a stretched film is annealed while kept under tension for attaining a higher treatment effect.

After the annealing treatment, it is desirable that the surface is oxidized by corona discharge treatment or plasma treatment in consideration of the later printability thereof. Not specifically defined, the overall thickness of the surrounding label of the invention is preferably from 40 to 400 μm, more preferably from 50 to 250 μm, even more preferably from 60 to 100 μm.

The thickness of the layer (B) to be in contact with a water-based adhesive, which may be provided in the surrounding label of the invention, is not specifically defined. Preferably, the thickness is from 1 to 35 μm, more preferably from 2 to 30 μm, even more preferably from 3 to 25 μm. As so mentioned in the above, the water absorption of the label may be controlled by the thickness of the layer (B) to be in contact with a water-based adhesive.

Fitting of Surrounding Label to Article:

The surrounding label of the invention may be applied to various articles by suitably selecting the type of the water-based adhesive to be used for it; and when emulsion-type adhesives are used, those having a suitable phase transition temperature may be selected.

The material to constitute the article to which the surrounding label of the invention is applied includes, for example, metals such as aluminium, stainless; glass; ceramics; plastic such as high-density polyethylene, polypropylene, polyester (e.g. polyethylene terephthalate (PET)), polystyrene, polyvinyl chloride, polycarbonate. Above all, preferred are metals such as aluminium, stainless; glass; ceramics; high-density polyethylene, polypropylene, polyester, polystyrene; and more preferred is polyester (e.g., PET bottle).

The article to which the surrounding label of the invention is applied may be any one capable of being labeled with the surrounding label as surrounded by it, and the shape and the use of the article are not specifically defined. For example, regarding the shape thereof, the cross section of the article to be surrounded by the label may be in any shape of circular, oval or rectangular one, but is preferably circular or oval, more preferably circular. The article may have a hollow part (for example, cylindrical or bottle-shaped), or may not have a hollow part. Further, the part to be surrounded by the label may have a diameter shorter than that of the part adjacent to it, or may have the same diameter. Preferred is an article having a throat of such that the diameter of the part thereof to be surrounded by the label is shorter than that of the part adjacent to it. Regarding the use of the articles to be labeled with the surrounding label of the invention, the articles include containers, pipes, articles for advertisement, batons, poles, lighting instruments, etc. Especially preferred are containers. Concretely mentioned are containers for water (mineral water), refreshing drinks, carbonated drinks, juices, milk drinks, lactic acid beverages, beer, wine, sake, various spirituous liquors, nutritional drinks, seasonings, medicines, cosmetics, chemicals, etc.; but there is given no limitation to their types.

EXAMPLES

The invention is described more concretely with reference to the following Production Examples, Working Examples, Comparative Examples and Experimental Examples. The material used, its amount and the ratio, the details of the treatment and the treatment process shown in Production Examples and Working Examples may be suitably modified or changed not overstepping the spirit and the scope of the invention. Accordingly, the invention should not be limitatively interpreted by the Examples mentioned below.

Production of Surface-Treating Agent

A surface-treating agent (E), water-soluble cationic copolymer was produced as follows: 500 parts of diallylamine hydrochloride (60%), 13 parts of acrylamide (40%) and 40 parts of water were put into a reactor equipped with reflux condenser, a thermometer, a dropping funnel, a stirrer and a gas-introducing duct, and the inner temperature was elevated up to 80° C. with circulating nitrogen gas in the system. With stirring, 30 parts of a polymerization initiator, ammonium persulfate (25%) was dropwise added to it through the dropping funnel, taking 4 hours. After the addition, the reaction was continued for 1 hour to obtain a viscous pale yellow liquid. 50 g of the liquid was taken out, and poured into 500 ml of acetone to give a white precipitate. The precipitate was collected by filtration, well washed twice with 100 ml of acetone, and then dried in vacuum to obtain a white solid. The weight-average molecular weight of the thus-obtained polymer, as determined through GPC, was 55000.

Production of Surface-Treated Calcium Carbonate

40% by weight of heavy calcium carbonate (mean particle size, 8 μm; Nippon Cement's dry powder) and 60% by weight of water were fully stirred and mixed into slurry, and the surface-treating agent (E) produced above was added to it in an amount of 0.06 parts by weight relative to 100 parts by weight of heavy calcium carbonate, and using an on-table attritor-type medium stirring mill, this was wet-ground with glass beads having a diameter of 1.5 mm, at a filling ratio of 170% and at a peripheral speed of 10 m/sec.

Next, 50 parts of an aqueous solution of 2% by weight of a mixture comprising sodium alkanesulfonate having 14 carbon atoms and sodium alkanesulfonate having 16 carbon atoms as the main ingredients was added and stirred. Next, this was classified through a 350-mesh screen, and the slurry having passed through the 350-mesh screen was dried with a medium fluidized drier, Nara Machinery Manufacturing's MSD-200. The mean particle size of the obtained calcium carbonate was measured with Microtrack (by Nikkiso), and was 1.5 μm.

Production of Thermoplastic Resin Film

Examples 1 to 10

Thermoplastic resin films satisfying the conditions of the invention (Examples 1 to 10) were produced according to the following process.

Table 1 shows the details of the materials used herein. In the Table, "MFR" means melt flow rate. Table 3 shows the type and the blend ratio (% by weight) of the materials used in producing the individual thermoplastic resin films, the stretching condition, the number of the layers and the thickness of each layer. The number of the material in Table 3 corresponds to the number of the material described in Table 1.

In Production Example 1, the composition [A] and the compositions [B] and [C] as in Table 3 were melt-kneaded in three separate extruders set at 250° C. and coextruded through it to give a three-layered structure of B/A/C, and this was cooled with a cooling device to 70° C. to obtain an unstretched film. The unstretched film was heated at a stretching temperature (1) as in Table 3 and stretched by 6 times in the machine direction between rolls, then annealed at a temperature higher by 20° C. than the stretching temperature (1), and both surfaces of the obtained film were processed for corona treatment, using a discharger (by Kasuga Electric) at 40 $W/m^2$·min, thereby obtaining a three-layered monoaxially-stretched film.

In Production Example 2, the composition [A] and the compositions [B] and [C] as in Table 3 were melt-kneaded in three separate extruders set at 250° C. and coextruded through it to give a three-layered structure of B/A/C, and this was cooled with a cooling device to 70° C. to obtain an unstretched film. The unstretched film was heated at a stretching temperature (1) as in Table 3 and stretched by 5 times in the machine direction between rolls. Then, this was heated at a stretching temperature (2) as in Table 3 and stretched in the transverse direction by 8 times, using a tenter stretcher, then annealed at a temperature higher by 20° C. than the stretching temperature (2), and both surfaces of the obtained film were processed for corona treatment, using a discharger (by Kasuga Electric) at 40 $W/m^2$·min, thereby obtaining a three-layered biaxially-stretched film.

In Production Examples 3 to 10, the composition [A] as in Table 3 were melt-kneaded in an extruder set at 250° C., then extruded out and cooled with a cooling device to 70° C., thereby obtaining a single-layered unstretched film. The unstretched film was heated at a stretching temperature (1) as in Table 3 and stretched by 5 times in the machine direction between rolls to give an MD-monoaxially-stretched film. Next, the compositions [B] and [C] were melt-kneaded in two separate extruders set at 250° C. and laminated on both surfaces of the above MD-monoaxially-stretched film, then heated at a stretching temperature (2) as in Table 3 and stretched in the transverse direction by 8 times using a tenter stretcher, then annealed at a temperature higher by 20° C. than the stretching temperature (2), and both surfaces of the obtained film were processed for corona treatment, using a discharger (by Kasuga Electric) at 40 $W/m^2$·min, thereby obtaining a monoaxially-stretched/biaxially-stretched/monoaxially-stretched, three-layered stretched film.

Test of Thermoplastic Resin Film

The thermoplastic resin films obtained in Production Examples 1 to 10 were evaluated according to the following tests.

(1) Water Absorption:

According to the Cobb method (JIS-P-8140), the produced thermoplastic resin film was kept in contact with water for 120 seconds, using a Cobb size tester (by Kumagai Riki Kogyo), and then the water absorption (liquid absorption capacity) was measured.

(2) Elmendorf Tear Strength:

The tear strength of the produced thermoplastic resin film was measured, using an Elmendorf tear strength tester (by Tozai Seiki; trade name "Digital Elmendorf Tear Tester") according to the test method of JIS-P-8116. The samples were tested both in the stretching direction, MD and in the direction perpendicular to the stretching direction, TD.

(3) Surface Strength of Bonding Side:

"Cellotape" (trade name by Nichiban) was stuck to bonding side (i.e. the surface of layer (B)) of the produced thermoplastic resin film, and using an internal bond tester (by Kumagai Riki Kogyo), the strength (kg-cm) in peeling the Cellotape was measured.

Fabrication of Surrounding Label and Fitting to Container

Examples and Comparative Examples

Each thermoplastic resin film obtained in Production Examples was cut into surrounding labels (width 222 mm×length 70 mm) each having a pick-up part as in FIG. 1; and various water-based adhesives (a to c) shown in Table 2 were applied to them. A PET bottle having a capacity of 500 ml (circular bottle having a diameter of 60 mm) was labeled with any of them as in Examples 1 to 7 and Comparative Examples 1 to 5 shown in Table 4. The results are in Table 4. In labeling, used was a labeling machine LNS Model (by Koyo Automatic Machine). The part to be bonded to a PET bottle with an adhesive (label beginning part) was 20 mm. The label was wound around a PET bottle like a headband, starting from the beginning part; and this was bonded to the bottle, using an adhesive applied to the overlapping width of 20 mm of the overlapping part (label ending part) as superposed on the beginning part. The coating area of the bonding part (beginning part) of the label to the container, PET bottle was 20 mm (width)×70 mm (length); and the coating area of the ending part of the label thus wound like a headband was also 20 mm (width)×70 mm (length).

In Examples 1 to 5, the adhesive a in Table 2 was applied to the test piece of Production Examples 1 to 5, in an amount of 10 $g/m^2$ as the solid concentration thereof, thereby fabricating labels.

In Example 6, the adhesive b in Table 2 was applied to the test piece of Production Example 4, in an amount of 10 $g/m^2$ as the solid concentration thereof, thereby fabricating a label.

In Example 7, the adhesive c in Table 2 was applied to the test piece of Production Example 4, in an amount of 10 $g/m^2$ as the solid concentration thereof, thereby fabricating a label.

In Comparative Examples 1 to 5, the adhesive a in Table 2 was applied to the test piece of Production Examples 6 to 10, in an amount of 10 g/m$^2$ as the solid concentration thereof, thereby fabricating labels, as in Table 4.

Test of Labeled Container (1) Evaluation of Labelability:

The surrounding labels fabricated in Examples and Comparative Examples were coated with a water-based adhesive and fitted to a container according to the above-mentioned labeling method, and immediately after the labeling, the condition of the label fitted to the container was checked.

○: The label was bonded to the PET bottle (usable)

Δ: The label was bonded to the PET bottle, but the label peeled as rubbed against the conveyor wall in transporting the bottles (unusable).

x: The label dropped from the PET bottle (unusable).

(2) Measurement of Peeling Strength:

The surrounding labels fabricated in Examples and Comparative Examples were coated with a water-based adhesive and fitted to the surface of a PET bottle according to the above-mentioned labeling method; and after 10 days, the label end was picked up by a clip, and the label was peeled in the direction of 180 degrees, whereupon the peeling strength was measured using Digital Force Gauge (by Imada Manufacturing)

(3) Evaluation of Tearability:

Of the PET bottles labeled with the surrounding label fabricated in Examples and Comparative Examples, the pick-up part was picked up and pulled in the vertical direction of the label, whereupon the tearability of the label was evaluated according to the following criteria.

○○: Easily and smoothly torn, and the pick-up part is usable as an application label and the like (usable).

○: Tearable, but the pick-up part tapered (usable).

x: The pick-up part was cut during tearing (unusable).

(4) Evaluation of Peelability:

The PET bottles labeled with the surrounding label fabricated in Examples and Comparative Examples were torn and peeled, and visually checked for the label substrate residue and the paste residue in the total adhesive-coating area of the part of the label bonded to the PET bottle; and the area was visually confirmed according to the following criteria.

◎: The proportion of the label substrate residue or the water-based adhesive residue was from 0% to less than 5% (usable).

○: The proportion of the label substrate residue or the water-based adhesive residue was from 5% to less than 20% (usable).

Δ: The proportion of the label substrate residue or the water-based adhesive residue was from 20% to less than 30% (unusable).

x: The proportion of the label substrate residue or the water-based adhesive residue 30% or more (unusable).

TABLE 1

| Material No. | Material Name | Details |
|---|---|---|
| 1 | Propylene homopolymer | Propylene homopolymer (Nippon Polypro's trade name, Novatec PP[FY4], having MFR of 5 g/10 min (230° C., 2.16 kg load) and a melting point of 164° C. (DSC peak temperature). |
| 2 | High-density polyethylene | Ethylene homopolymer (Nippon Polyethylene's trade name, Novatec HD[HJ360], having MFR of 5.5 g/10 min (190° C., 2.16 kg load) and a melting point of 132° C. (DSC peak temperature). |
| 3 | Heavy calcium carbonate | Calcium carbonate dry powder (Bihoku Funka Kogyo's trade name, Softon 1800) having a mean particle size of 1.25 μm, as measured according to an air permeability method. |
| 4 | Surface-treated calcium carbonate | Surface-treated calcium carbonate obtained through wet grinding and surface treatment in Production Example. |

TABLE 2

| No. | Trade Name | Manufacturer | Ingredient |
|---|---|---|---|
| a | Tokiwanol 2100W | Tokiwa Chemical Industries | milk casein |
| b | Impabo (TV905) | Nippon NSC | modified starch |
| c | P-9 | Koizumi Trading | synthetic product |

TABLE 3

| | Composition [A] | | Composition [B] | | Composition [C] | | Stretching | | | |
|---|---|---|---|---|---|---|---|---|---|---|
| | | | | | | | Stretching temperature | Stretching temperature | | |
| | material No. | amount (wt. %) | material No. | amount (wt. %) | material No. | amount (wt. %) | (1) (° C.) | (2) (° C.) | number of layers | direction |
| Production | 1 | 70 | 1 | 40 | 1 | 100 | 130 | — | 3 | [C]-monoaxial |
| Example 1 | 3 | 30 | 4 | 60 | | | | | | [A]-monoaxial |
| | | | | | | | | | | [B]-monoaxial |
| Production | 1 | 60 | 1 | 70 | 1 | 55 | 140 | 155 | 3 | [C]-biaxial |
| Example 2 | 2 | 10 | 4 | 30 | 3 | 45 | | | | [A]-biaxial |
| | 3 | 30 | | | | | | | | [B]-biaxial |
| Production | 1 | 60 | 1 | 70 | 1 | 55 | 140 | 155 | 3 | [C]-monoaxial |
| Example 3 | 2 | 10 | 4 | 30 | 3 | 45 | | | | [A]-biaxial |
| | 3 | 30 | | | | | | | | [B]-monoaxial |
| Production | 1 | 60 | 1 | 40 | 1 | 51.5 | 140 | 155 | 3 | [C]-monoaxial |
| Example 4 | 2 | 10 | 4 | 60 | 2 | 3.5 | | | | [A]-biaxial |
| | 3 | 30 | | | 3 | 45 | | | | [B]-monoaxial |
| Production | 1 | 60 | 1 | 30 | 1 | 55 | 140 | 155 | 3 | [C]-monoaxial |
| Example 5 | 2 | 10 | 4 | 70 | 3 | 45 | | | | [A]-biaxial |
| | 3 | 30 | | | | | | | | [B]-monoaxial |
| Production | 1 | 60 | 1 | 90 | 1 | 55 | 140 | 155 | 3 | [C]-monoaxial |

TABLE 3-continued

| | | | | | | | | | | |
|---|---|---|---|---|---|---|---|---|---|---|
| Example 6 | 2 | 10 | 4 | 10 | 3 | 45 | | | | [A]-biaxial |
| | 3 | 30 | | | | | | | | [B]-monoaxial |
| Production | 1 | 60 | 1 | 40 | 1 | 55 | 140 | 155 | 3 | [C]-monoaxial |
| Example 7 | 2 | 10 | 4 | 60 | 3 | 45 | | | | [A]-biaxial |
| | 3 | 30 | | | | | | | | [B]-monoaxial |
| Production | 1 | 60 | 1 | 10 | 1 | 55 | 140 | 155 | 3 | [C]-monoaxial |
| Example 8 | 2 | 10 | 4 | 90 | 3 | 45 | | | | [A]-biaxial |
| | 3 | 30 | | | | | | | | [B]-monoaxial |
| Production | 1 | 60 | 1 | 40 | 1 | 55 | 140 | 155 | 3 | [C]-monoaxial |
| Example 9 | 2 | 10 | 4 | 60 | 3 | 45 | | | | [A]-biaxial |
| | 3 | 30 | | | | | | | | [B]-monoaxial |
| Production | 1 | 60 | 1 | 40 | 1 | 55 | 140 | 155 | 3 | [C]-monoaxial |
| Example 10 | 2 | 10 | 4 | 60 | 3 | 45 | | | | [A]-biaxial |
| | 3 | 30 | | | | | | | | [B]-monoaxial |

| | Stretching | | | Test | | | |
|---|---|---|---|---|---|---|---|
| | thickness (μm) | draw ratio (times) | areal ratio of layer [B] | water absorption (ml/$m^2$) | Elmendorf tear test (gf) MD | TD | surface strength of bonding side (kg-cm) |
| Production | 10 | 6 | 6 | 5 | 10 | 180 | 1.3 |
| Example 1 | 80 | | | | | | |
| | 10 | | | | | | |
| Production | 5 | 5/8 | 40 | 2.5 | 60 | 45 | 1.1 |
| Example 2 | 90 | | | | | | |
| | 5 | | | | | | |
| Production | 10 | 5/8 | 8 | 1.2 | 32 | 23 | 1.8 |
| Example 3 | 80 | | | | | | |
| | 10 | | | | | | |
| Production | 10 | 5/8 | 8 | 7 | 30 | 20 | 1.0 |
| Example 4 | 80 | | | | | | |
| | 10 | | | | | | |
| Production | 20 | 5/8 | 8 | 28 | 35 | 16 | 0.9 |
| Example 5 | 60 | | | | | | |
| | 20 | | | | | | |
| Production | 10 | 5/8 | 8 | 0.8 | 35 | 15 | 3.1 |
| Example 6 | 80 | | | | | | |
| | 10 | | | | | | |
| Production | 0.5 | 5/8 | 8 | 0.3 | 33 | 18 | 1.2 |
| Example 7 | 99 | | | | | | |
| | 0.5 | | | | | | |
| Production | 40 | 5/8 | 8 | 35 | 45 | 14 | 0.5 |
| Example 8 | 20 | | | | | | |
| | 40 | | | | | | |
| Production | 10 | 5/8 | 8 | 7 | 7 | 4 | 1.0 |
| Example 9 | 20 | | | | | | |
| | 10 | | | | | | |
| Production | 10 | 5/8 | 8 | 7 | 147 | 60 | 1.0 |
| Example 10 | 230 | | | | | | |
| | 10 | | | | | | |

TABLE 4

| | | | Practicability Evaluation (Experimental Examples) | | | | |
|---|---|---|---|---|---|---|---|
| | Thermoplastic Resin Film | Type of Paste | Labelability | Peeling Strength (N/20 mm) | Tearability Evaluation | Peelability Evaluation | Surface Condition of Bottle after label peeling |
| Example 1 | Production Example 1 | a | ○ | 0.6 | ◎ | ◎ | no paste residue |
| Example 2 | Production Example 2 | a | ○ | 0.8 | ○ | ○ | paste residue in 15% of overall paste-coated area |
| Example 3 | Production Example 3 | a | ○ | 1.3 | ◎ | ◎ | no paste residue |
| Example 4 | Production Example 4 | a | ○ | 2.0 | ◎ | ◎ | no paste residue |
| Example 5 | Production Example 5 | a | ○ | 4.2 | ◎ | ○ | paste residue in 12% of overall paste-coated area |
| Example 6 | Production Example 4 | b | ○ | 2.2 | ◎ | ○ | paste residue in 6% of overall paste-coated area |

TABLE 4-continued

| | Thermoplastic Resin Film | Type of Paste | Practicability Evaluation (Experimental Examples) Labelability | Peeling Strength (N/20 mm) | Tearability Evaluation | Peelability Evaluation | Surface Condition of Bottle after label peeling |
|---|---|---|---|---|---|---|---|
| Example 7 | Production Example 4 | c | ○ | 0.8 | ◎ | ◎ | no paste residue |
| Comparative Example 1 | Production Example 6 | a | X(*1) | —(*1) | —(*1) | —(*1) | —(*1) |
| Comparative Example 2 | Production Example 7 | a | Δ(*2) | 4.5 | —(*2) | —(*2) | —(*2) |
| Comparative Example 3 | Production Example 8 | a | ○ | 1.5 | ◎ | Δ | paste residue in 24% of overall paste-coated area |
| Comparative Example 4 | Production Example 9 | a | ○ | 0.9 | X | —(3*) | —(3*) |
| Comparative Example 5 | Production Example 10 | a | ○ | 2.0 | X | —(3*) | —(3*) |

(*1)In labeling, the label could not be bonded.
(*2)The label could be bonded in labeling, but the label slipped in runway transportation.
(*3)The tearing was too strong or too weak, and both the tearability and the peelability could not be evaluated.

INDUSTRIAL APPLICABILITY

Taking advantage of an already-existing glue paste method, the surrounding label of the invention may be readily fitted to articles such as containers by winding around them, and after use, it may be readily torn and may be readily peeled from containers not too much leaving adhesive on the surface of articles. Accordingly, when the surrounding label of the invention is used for ecological returnable containers, then it is extremely useful as greatly reducing the labor in washing the containers.

What is claimed is:

1. A surrounding label comprising:

a beginning part and an ending part, a top edge and a bottom edge, a front side including a front surface layer, a back side including a back surface layer, and a length defined by a distance between an outer edge of the beginning part and an outer edge of the ending part, the top edge and the bottom edge extending from the outer edge of the beginning part to the outer edge of the ending part along the length of the surrounding label wherein:

a back side area of the ending part is configured to be superposed on and bonded with a water-based adhesive to a front side area of the beginning part, the back surface layer having a water absorption of 1 to 30 $ml/m^2$, the surrounding label has an Elmendorf tear strength, as measured in either a length direction from the beginning part to the ending part of the surrounding label or a direction perpendicular to the length direction, of 8 to 50 gF, at least a portion of the surrounding label contains a thermoplastic resin and at least one of an inorganic powder having a mean particle size of from 0.1 to 20 micrometers and an organic filler, the thermoplastic resin includes a crystalline polypropylene based resin, and the surrounding label is stretched by a draw ratio between 2 and 11.

2. The surrounding label according to claim 1, wherein the back side of the surrounding label has a surface strength of 0.9 to 2.0 kg-cm.

3. The surrounding label according to claim 1, wherein the back side area of the ending part is coated with the water-based adhesive.

4. The surrounding label according to claim 3, wherein the back side area of the ending part is coated with a water-based adhesive in a stripe that extends in a direction nearly perpendicular to the length direction.

5. The surrounding label according to claim 1, wherein a back side area of the beginning part of the label is adapted to bond with a water-based adhesive to an article to be labeled with the surrounding label.

6. The surrounding label according to claim 5, wherein the back side area of the beginning part is coated with the water-based adhesive.

7. The surrounding label according to claim 6, wherein the water-based adhesive is coated on the back side area of the beginning part in the form of any one or more patterns selected from the group consisting of dots, lattices, stripes and checks.

8. The surrounding label according to claim 1, wherein the label comprises a substrate layer, and wherein the front surface layer, the substrate layer and the back surface layer, which contacts the water-based adhesive, are configured in that order from the front side toward the back side.

9. The surrounding label according to claim 8, wherein the back surface layer contains the inorganic powder in an amount of at most 90% by weight.

10. The surrounding label according to claim 9, wherein the inorganic powder is surface-treated with a surface-treating agent.

11. The surrounding label according to claim 8, wherein the substrate layer and the front surface layer contain from 20 to 100% by weight of a thermoplastic resin, from 0 to 80% by weight of the inorganic powder and/or from 0 to 50% by weight of the organic filler.

12. The surrounding label according to claim 8, wherein the back surface layer is formed of an at least monoaxially-stretched, thermoplastic resin stretched film.

13. The surrounding label according to claim 8, wherein the surface strength of the back surface layer on a side thereof to be coated with the water-based adhesive is from 0.9 to 2.0 kg-cm.

14. The surrounding label according to claim 1, wherein the label is stretched in a direction nearly perpendicular to the length direction and the Elmendorf tear strength in the stretching direction is from 8 to 50 gF.

15. The surrounding label according to claim 8, wherein at least one side of the back surface layer or the front surface layer is printed.

16. The surrounding label according to claim 1, wherein the surrounding label includes a pick-up part having a width of at least 0.5 cm.

17. The surrounding label according to claim 16, wherein at least one notch is formed at one of the top and bottom edges along the length direction of the label and between one of the beginning part and the pick-up part and the ending part and the pick-up part.

18. The surrounding label according to claim 1, wherein the label further comprises a lottery, a coupon or an application ticket.

19. The surrounding label according to claim 17, wherein a part of the label adapted to be peeled from the pick-up part of the label forms a lottery, a coupon or an application ticket.

20. A labeled article comprising the surrounding label of claim 3 arranged around an article, wherein the back side area of the ending part and the front side area of the beginning part of the label are superimposed on each other and are bonded with the water-based adhesive, whereby the label is fitted to the article.

21. The labeled article according to claim 20, wherein the beginning part of the surrounding label is bonded to the article, and the label is wound around the article starting from the beginning part thereof.

22. The labeled article according to claim 21, wherein when the bonded label is peeled from the article, an adhesive residue remaining on the article is 0 to 20% of the area of the bonded beginning part.

23. The labeled article according to claim 21, wherein when the label has been bonded to the article for 24 hours or more, the peeling strength between the label and the article is 0.5 to 5 N/20 mm.

24. The labeled article according to claim 20, wherein the article is a container.

* * * * *